United States Patent [19]

MacChesney et al.

[11] 4,191,545
[45] Mar. 4, 1980

[54] OPTICAL FIBER FABRICATION PROCESS

[75] Inventors: John B. MacChesney, Lebanon; Paul B. O'Connor, Plainfield; Arthur D. Pearson, Bernardsville, all of N.J.

[73] Assignee: Bell Telephone Laboratories, Incorporated, Murray Hill, N.J.

[21] Appl. No.: 16,787

[22] Filed: Mar. 2, 1979

[51] Int. Cl.² ............................................ C03B 37/02
[52] U.S. Cl. ...................................... 65/3 A; 65/13; 427/166; 427/167
[58] Field of Search ................ 65/3 A, DIG. 7, 2, 13; 427/166, 167

[56] References Cited

U.S. PATENT DOCUMENTS

| 3,806,570 | 4/1974 | Flamenbaum et al. | 65/3 A X |
| 3,826,560 | 7/1974 | Schultz | 65/3 A |
| 4,149,867 | 4/1979 | Akamatsu et al. | 65/3 A |

Primary Examiner—Robert L. Lindsay, Jr.
Attorney, Agent, or Firm—Samuel H. Dworetsky

[57] ABSTRACT

Glass tubes which form an integral part of optical fiber preforms from which optical fibers are drawn are fabricated from tubular structures comprising amorphous powdery particles. The tubular structures are heated so as to fuse the particles thereby yielding a transparent tubular glass structure of optical fiber quality. During the fusing step, the structure is substantially constrained against shrinkage in both the radial and longitudinal direction thereby yielding a glass tube with improved dimensional characteristics.

23 Claims, 2 Drawing Figures

OPTICAL FIBER FABRICATION PROCESS

BACKGROUND OF THE INVENTION

This invention involves optical fiber fabrication processes.

DESCRIPTION OF THE PRIOR ART

A decade of intense effort has brought optical fiber fabrication technology to a point where fibers are fabricated regularly, on commercial production lines, with losses less than 5 db per km in the spectral region between 0.7 and 1.0μ. Fibers with losses less than 1 db per km at 1.3μ are currently fabricated in research facilities, and their fabrication on commercial production lines is projected for the near future. Attainment of such low losses is the product of both sophisticated design of the fiber structure, as well as advanced technology applied to the fabrication process.

Fiber designs which contribute to low loss characteristics, as well as low dispersion characteristics, include the use of ultrapure low loss materials and dopants, and the design of index of refraction configurations which result in particularly beneficial transmission properties. Both single mode and multi-mode fibers are readily fabricated. Multi-mode configurations include near-parabolic distributions in the radial dependence of the fiber's index of refraction. Protective jackets may be applied during the processing to yield fiber strengths approaching theoretical limits, with minimal loss.

Advances in the structural design of fibers have been matched by similar advances in fabrication technology. Early, inefficient technology has been replaced by more rapid processing which can yield the low loss, low dispersion fibers alluded to above. Among the major fabrication technologies which are currently practiced is the modified chemical vapor deposition (MCVD) process, disclosed in U.S. patent application Ser. No. 828,617. This process involves the production of amorphous, powdery, particles, in a tube, which serves as the locus of an appropriate homogeneous reaction. The particles are formed in the tube from glass precursor vapors, e.g., halides and oxygen, which are heated to temperatures most often in the region from 1300 to 1500 degrees C. A heat source, such as a flame, traverses the tube, serving both as a stimulus for the homogeneous, particle-forming reaction, as well as serving to fuse the deposited particles into a unitary transparent glass structure. (The term "fusion" as used in this application is qualitative and refers only to the transformation of the intermediate structure comprising amorphous powdery particles into a unitary transparent glassy structure. It is not meant to connote any particular type of transformation process.) Numerous layers are deposited on the interior of the tube as a result of repetitive passes of the heat source. The composition of the various layers is determined by the composition of the precursor vapor participating in the particle-forming reaction. The composition of these layers may be varied to obtain a gradation in index of refraction as required by of the particular structural design being fabricated. Subsequent to deposition and fusion, the tube may be collapsed to yield a preform, which is subsequently drawn into an optical fiber.

Although both the cladding and the core of the fiber may be deposited on the interior surface of the tube in the above-described MCVD process, the characteristics of the tube, both physical and chemical, play an important role in determining the optical properties of the resultant fiber. Clearly, if the tube plays an important role in the transmission of light in the ultimate fiber, its composition will critically affect the fiber's transmission characteristics. However, even if the tube does not play a major transmission role in the resultant fiber, its dimensional characteristics will still significantly affect the transmission properties of the fiber. Needless to say, there has consequently arisen a very vital interest in the properties and availability of such optical-fiber-quality glass tubes. However, in contradistinction to the active effort and advanced technology applied to fiber fabrication, the fabrication of such tubes involves techniques which technologically lags far behind. The materials for such tubes are usually natural silica-bearing sources, such as appropriate silica-bearing sands and quartz rock, which are taken through various processing steps in the course of which imperfections are visually detected and removed to obtain improved purity. The tube itself is ultimately formed by extrusion, or piercing and drawing.

SUMMARY OF THE INVENTION

This invention involves a fiber fabrication process in which the tubular member used to form the fiber preform is fabricated with high purity and good dimensional characteristics. In the invention, a tubular structure of amorphous, powdery particles is formed on an appropriate mandrel. The particulate material from which the intermediate structure is formed is fabricated from appropriate glass precursor vapors, thereby guaranteeing its high purity. The deposition process results in a uniform deposit with little deleterious density variation. Subsequent to formation of the particulate structure, it is removed from the mandrel and fused into a unitary transparent glassy structure. During this fusion process, the structure is constrained against substantial shrinkage in both the longitudinal and radial directions. The forces which normally tend toward shrinkage during this process are thus channelled to yield a structure with improved dimensional characteristics. Subsequent to formation of the tube, additional material may be appropriately deposited to yield an optical fiber preform from which an optical fiber is drawn.

DETAILED DESCRIPTION

The invention is a technique useful in the fabrication of optical fibers. According to the teachings of this invention, the glass tube, used during the formation of the preform from which the fiber is drawn, is fabricated from a tubular structure comprising amorphous, powdery particles which are fused to a unitary transparent glass tube while being constrained against shrinkage in both the radial and longitudinal directions. The fusion occurs in response to the application of heat to the structure while the structure is constrained by any appropriate technique. While the intermediate particulate tubular structure may be formed with the assistance of a mandrel, the mandrel and the structure are separated prior to fusion.

Figure 1:
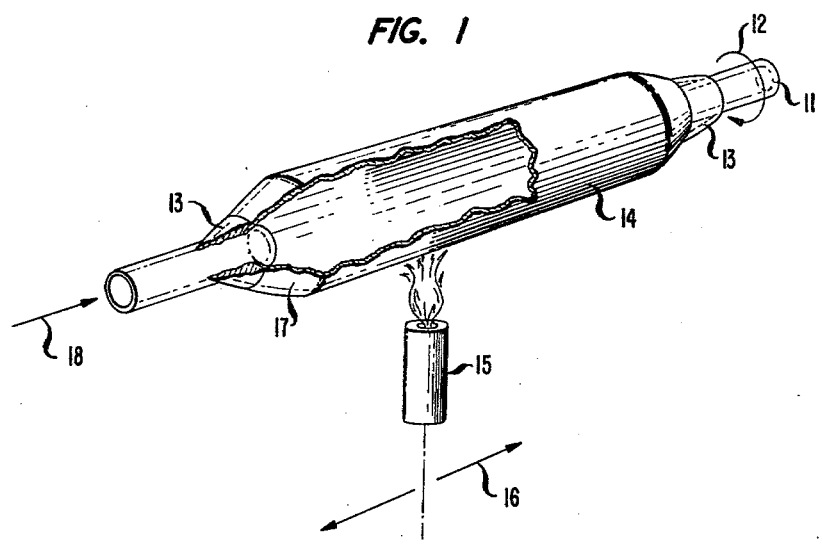
FIG. 1 is a schematic representation of the fusion of a particulate tubular structure into a unitary transparent glass tube according to the teachings of this invention.

The inventive process is more easily visualized with reference to FIG. 1 which represents schematically a specific embodiment of the instant invention. In this FIG. 14 is the particulate tubular structure, usually of wall thickness from 2 mm to 5 cm, previously formed from amorphous, powdery, particles. The structure has been removed from any mandrel used during its formation and has been connected to appropriate glass tubes, 11, by applying heat to the regions, 13, of the structure, thereby simultaneously melting the ends of the structure and fusing it into a glass which becomes integral with the supporting tube, 11. In other embodiments, the supporting tubes may be placed on the mandrel prior to particle deposition, and the deposition caused to overlap the tubes. A tapered section 17, may form during deposition, and, depending on the requirements of the practitioner may later be discarded. The rotation means, 12, may conveniently comprise a glass lathe. In such an embodiment, the glass tubes, 11, to which the particulate structure has been fused, are securely installed in appropriate chucks which rotate synchronously. This arrangement simultaneously provides the means for constraining the structure against substantial longitudinal shrinkage during the fusion step to follow and means for rotating the structure during fusion to obtain more uniform heating.

A means, 18, is also provided to prevent substantial radial shrinkage during the fusion step. In this embodiment, the radial constraint means comprises a means to internally pressurize the tube. In conjunction with this pressurization, the opposite end of the tube may be closed. The internal pressure will usually be monitored, and will most often be maintained between 0.1 inches and 1.0 inches of water for wall thicknesses between 2 mm and 5 cm. when in the particulate state. The amount of pressure required to maintain the tube internal diameter will depend on the wall thickness, and for other wall thicknesses may fall outside this range. Ideally, an inert gas is used for internal pressurization. However, some other gas may be used whose reaction with the tubular structure during the fusion step to follow is not deleterious and even perhaps beneficial. (This aspect of the invention, may be viewed as bearing some resemblance to pressurization of glass tubes during collapse as disclosed in U.S. patent application Ser. No. 857,933).

Figure 2:
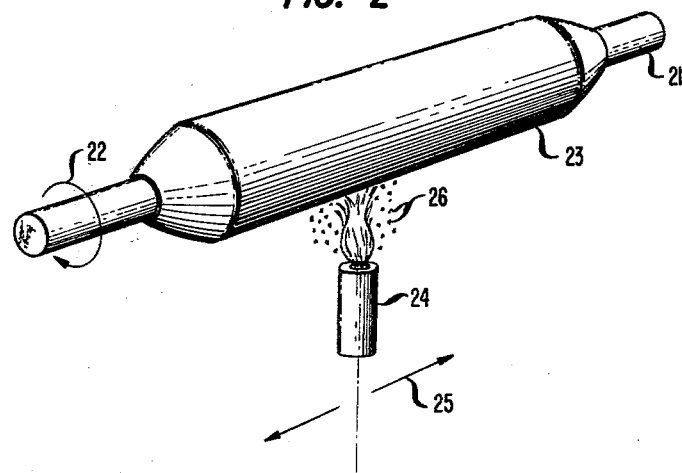
FIG. 2 is a schematic representation of the formation of a particulate tubular structure from which the glass tube is ultimately formed.

The particulate structure is fused to a unitary transparent glass tube, while in the configuration of FIG. 2, by traversing the structure, utilizing an appropriate traversal means shown as 16 in the FIG., with a heat source, such as a flame, shown as 15 in the FIG. In the FIG. the region to the left of the flame has already been fused. The temperature to which the structure must be raised to obtain appropriate fusion depends upon the composition of the structure and the rate of traversal. Pure silica requires a temperature of from 1400 to 1900 degrees C. when a flame of from 2–4 cm in width traverses the tube at a rate of 3–7 cm/min. (All temperatures measured here are based on optical pyrometer measurements which are accurate to within 200 degrees C.). Doped silicates such as germania- silica, borosilicate, germanium borosilicate or phosphosilicates may be fused at lower temperatures with otherwise similar fusion parameters.

As noted above, an aspect of this invention is the requirement that the particulate tubular structure is constrained, both radially and longitudinally, during the fusion step in which it is transformed to a unitary transparent glass structure. The invention, as properly construed, encompasses any constraint which acts to limit the uncontrolled shrinkage which occurs when the particulate structure is fused without any constraint at all. Within the broad definition of the invention, there are included embodiments where some shrinkage, either radial, longitudinal, or a combination thereof, occurs during fusion. Exemplary embodiments in this category include applications in which the tube diameter is varied either during or after fusion. This may be done by varying the internal pressure of the heated tube. Alternately increasing and decreasing the tube diameter in this manner may yield walls of more uniform thickness and/or smoothness. In other embodiments, thick wall tubes may be fabricated and subsequently blown to larger diameter, thinner walled tubes.

Even in those embodiments where the inner diameter of the tube is constrained strictly against any shrinkage during fusion, the wall thickness wall decrease during such fusion. Such decrease in wall thickness is a natural and physically required result of the densification which occurs during fusion. The particulate structure which is originally deposited may be relatively porous, in part by nature, and in part by design. Densities of between 15% and 50% of that of the transparent glass may be obtained by controlling the deposition temperature, for example, to between 800 and 1200 degrees C. for silica deposition. Such densities are found to enhance the beneficial removal of gaseous bi-products during processing. The structure which then densifies during fusion and must experience some dimensional shrinkage (in the inventive case, shrinkage in wall thickness) to accomodate this densification, if only on basic principles.

Since the structure in this invention is constrained during fusion, any forces tending toward longitudinal or radial shrinkage are redirected and result in a significant decrease in the wall thickness of the structure. In part as a result of this constraint and redirection of the forces tending toward shrinkage, it is found that the dimensional characteristics of the tube are particularly uniform. For example, in some embodiments, both the wall thickness and the circularity are found to be constant to within less than 2% when this invention is practiced. Such dimensional consistency is of special significance since any non- uniformity in the dimensional characteristics of the tube will deleteriously affect the optical properties of the fiber which may be ultimately formed.

An additional advantage which accrues to the practitioner of this invention, as compared to the prior art practitioner, is the fact that the tube may be formed from particularly pure glass, both doped and undoped. Heretofore, only pure siica tubes, and silica tubes doped with boron oxide, have been commercially available. Commercial Vycor tubes may contain some boron, although their boron concentration is limited, and they oft-times contain other deleterious impurities. However, wide ranges of dopant concentrations are desirable, if only to provide better expansion match between the tube used as a starting member in MCVD and the subsequently deposited layers of glass. Expansion mismatch, especially in high N. A. fiber performs, often results in breakage during the severe thermal cycling to which the preform is exposed during processing. Such wide dopant concentrations, using dopants such as germanium oxide, phosphorous oxide, titanium oxide, aluminum oxide and boron oxide can now be obtained using this invention.

FIG. 2 schematically represents the formation of the amorphous particles from which the tube is formed. In this embodiment, the amorphous powdery particles are formed from appropriate glass precursor vapors which are not shown. The vapors are passed through an exemplary oxidizing burner, 25, in which the precursor vapors, such as silicon tetrachloride, germanium tetrachloride, boron trichloride, phosphorus trichloride, phosphorus oxychlorides and oxygen are reacted to form powdery amorphous oxidic particles, 26. These particles are deposited on an appropriate mandrel, 21, which is rotated by a rotation means, 22. A particulate structure, 23, is obtained by repeatedly traversing the mandrel relatively using an appropriate traversal means, 25. The structure may be of uniform composition or may have an index of refraction, or composition, which varies radially depending upon the needs of the practitioner. As discussed above, the deposition temperature determines the porosity of the structure. This temperature may be controlled, even through the use of auxiliary heat sources such as ovens, to obtain the desired porosity. Subsequent to deposition, the structure may be removed and is fused as discussed above in the description of FIG. 1.

The tubular structure which is formed in this invention bears some resemblance to tubular structures fabricated in the prior art both for general use, as in U.S. Pat. No. 3,644,607, or in the fabrication of optical fiber preforms, as described in U.S. Pat. No. Re. 28,029. In these and other prior art processes, tubular structures of amorphous powdery particulate material are formed and are subsequently fused into unitary transparent glass tubes. However, in these prior art processes, the tubular structure may not be significantly constrained during the fusion process and hence may shrink in both the radial and longitudinal directions. In the instant invention, however, the structure is constrained against shrinkage in both the radial and longitudinal direction during fusing, thereby yielding improved dimensional properties. Other techniques, such as those disclosed in U.S. Pat. No. 3,806,570, involve the formation of tubes which are constrained during fusion. However, such processes involve fusion on the mandrel with the associated possibility of contamination. This invention involves fusion of the particulate structure subsequent to removal from the mandrel and while under both radial and longitudinal constraint.

While the tubes formed according to the teachings of this invention may be used for any purpose, they find particularly advantageous applications in the fabrication of optical fibers. They may be used, for example, in the MCVD process as a starting member on the inside surface of which additional glass material is deposited to yield an optical fiber preform from which the optical fiber is drawn. Such processes are described in detail in U.S. patent application Ser. No. 828,617.

Additional variations of the invention may be practiced to obtain still further improvements. For example, the specific properties of the mandrel may be chosen to simplify removal of the intermediate particulate structure, which may be fragile and subject to breakage unless properly handled. It would be desirable for example to use a mandrel which has a coefficient of expansion greater than that of the particulate material which is to be deposited, i.e., greater than about $0.5 \times 10^{-6}/°C$. or $2 \times 10^{-6}/°C$. Then upon cooling, subsequent to deposition, both the mandrel and particulate structure will shrink. However, the mandrel, by virtue of its greater coefficient of expansion, will shrink more than the particulate structure, thereby simplifying removal of the particulate structure prior to fusion. Such exemplary mandrel materials include alumina, aluminum or silicon carbide. To maximize these beneficial coefficient of expansion effects, the mandrel may be heated, in some embodiments, prior to particulate deposition, and/or cooled subsequent to completion of the deposition step. The mandrel may be parallel or additionally may be slightly tapered with a taper less than 60 mils per foot to simplify removal of the particulate structure. While fusion occurs primarily subsequent to deposition, the mandrel may be heated during deposition to yield some fusion during the depostion, especially in the initially deposited layers, thereby simplifying the removal step and improving the surface properties of the resultant tube.

While constraint of the structure during fusion goes a long way towards guaranteeing adequate dimensional characteristics of the glass tube, additional steps may be taken to further improve these resultant dimensional characteristics. Specifically, the heat source which traverses the tube during fusion may be selected to minimize even minor distortion. Specifically, extended heat sources are found to result in bowing of the structure, associated, it is believed, with a lowered viscosity region whose extent is so long that adequate support is not provided. Consequently, heat sources will usually be less than 2 fused tube diameters in extent especially if their temperature is greater than 1200 degrees C. It is possible, however, that lower temperature heat sources may also be used for fusion, since in such embodiments, the viscosity of the structure may not be as severely lowered. However, in such embodiments, which include totally enclosing or inserting the tube within an oven, the fusion period will be extended, at times to lengths which render the process commercially impractical. However, commercially practical heat sources will most likely be of limited extent, i.e., 1–4 cm., such as exemplary oxy-hydrogen burners. Such relatively high temperature sources are capable of fusing the structure in a single traverse.

EXAMPLE

In this example, particulate material is deposited on an aluminum oxide mandrel, 18 inches long, which has a taper of 0.024 inches per foot of length and a maximum diameter of 1.6 cm. The mandrel is mounted in a glass lathe which is used to rotate the mandrel at approximately 60 RPMs during deposition. The mandrel is slowly preheated prior to deposition by passing an oxy-hydrogen torch along the length of the mandrel. In this way, the mandrel is raised to a temperature greater than 500 degrees C. prior to deposition. In this embodiment, the glass precursor particles were formed in an oxidizing burner. The flame was supported by methane fed to the burner at between 6 and 7.5 liters per minute and oxygen simultaneously supplied to the burner at between 6 and 7.5 liters per minute. Glass precursor vapors were fed into the center of the flame in the form of silicon tetrachloride at 10 grams per minute, boron tetrachloride at 212 cc per minute and oxygen at 400 cc per minute. The glass precursor vapors may be supplied by bubbling the oxygen through appropriate liquids or by the specific process described in U.S. patent application Ser. No. 009,935. The particles which are formed by the reaction of the vapors in the flame are directed to the mandrel and collect on it to form a cylindrical structure as the flame traverses back and forth over the length of the mandrel. The particulate deposition proceeds at an average rate of 1.3 grams per minute and at a temperature of approximately 1000 to 1050 degrees C. The flame temperature is adjusted so as to obtain the desired density of collected particles. At the temperatures used in this embodiment, a 5 mole% $B_2O_3$-$SiO_2$ powder is obtained with a porosity of 65%. After a sufficient volume of particles is collected, the reactant stream is shut off and the porous tube is allowed to cool to room temperature. In this embodiment, 100 passes of the torch resulted in a structure approximately 12 inches long, with a wall thickness of one cm, and an inside diameter of approximately 1.6 cm.

Subsequent to cooling, the tapered ends of the porous tube are discarded, and the tube is removed from the mandrel. The porous tube is then mounted in a glass working lathe by inserting glass tubes of appropriate size into the ends of the particulate tube, and fusing the ends of the porous tube to the glass tubes by application of heat. The glass tubes when so fused to the porous structure and mounted in the glass lathe serve to constrain the porous tube from shrinnkage in the longitudinal direction during fusion. One support tube was stoppered, while a slight positive pressure of from 0.3 to 0.6 inches of water of a suitable gas such as oxygen, helium or mixtures thereof was established within the tube via the second support tube. A high temperature heat source of approximately 1700 degrees C. such as an oxi-hydrogen flame, or a graphite resistance furnace, is gradually traversed from one end of the tube to another, thus causing the porous material to fuse into a transparent glass tube. Additional material is then deposited on the inner portion of the tube as in the MCVD process to yield a preform from which the optical fiber is drawn. The optical fiber was measured to have an optical loss of 3.8 db/km at 0.82 $\mu$m.

We claim:

1. A method of forming an optical fiber comprising
    rotating a substantially cylindrical mandrel about its longitudinal axis;
    forming amorphous, powdery particles;
    depositing the particles on the substantially cylindrical mandrel to form an intermediate tubular structure comprising amorphous, powdery particles;
    fusing the intermediate tubular structure into a transparent tubular glass structure;
    depositing additional material on the tubular glass structure; and
    drawing the structure into a fiber, the invention characterized in that
    the intermediate tubular structure is removed from the mandrel prior to fusion and is constrained against shrinkage in both the longitudinal and radial direction during fusing.

2. The method of claim 1 wherein the intermediate structure is constrained against longitudinal shrinkage by attaching the ends of the structure to supporting members which are appropriately constrained during the sintering.

3. The method of claim 2 wherein the supporting members are fused to the intermediate structure.

4. The method of claim 3 wherein the supporting members are glass.

5. The method of claim 2 wherein the intermediate tubular structure is constrained against shrinkage in the radial direction during fusing by means of internal pressurization.

6. The method of claim 5 wherein the internal pressure is between 0.1 and 1.0 inches of water.

7. The method of claim 6 wherein the intermediate structure is fused by traversing it axially with an appropriate heat source.

8. The method of claim 7 wherein the axial extent of the heat source is less than two diameters of the intermediate structure.

9. The method of claim 5 wherein the mandrel is preheated prior to the particle deposition.

10. The method of claim 9 wherein the mandrel is heated during particulate deposition.

11. The method of claim 10 wherein some sintering occurs during deposition.

12. The method of claim 1, 9 or 10 wherein the mandrel is cooled prior to removal of the intermediate structure.

13. The method of claim 1 wherein the mandrel is tapered.

14. The method of claim 1 or 9 wherein the mandrel is alumina, aluminum or silicon carbide.

15. The method of claim 7 wherein the intermediate structure is fused in a single pass of an appropriate heat source.

16. The method of claim 15 wherein the heat source is an oxy-hydrogen burner.

17. The method of claim 5 wherein after fusing the tube diameter is altered.

18. The method of claim 5 wherein the tube is flushed with gas prior to fusing.

19. The method of claim 5 wherein the glass precursor particulates are formed thermochemically.

20. The method of claim 5 wherein the particulates are formed from appropriate glass precursor vapors.

21. The method of claim 20 wherein the particulates are formed in an oxidizing burner.

22. The method of claim 21 wherein the burner traverses the mandrel axially during the deposition.

23. A method of forming a glass tube comprising
    rotating a substantially cylindrical mandrel about its longitudinal axis;
    forming amorphous, powdery particulate;
    depositing the paticles on the substantially cylindrical mandrel to form an intermediate tubular structure comprising precursor particles;
    fusing the intermediate tubular structure into a transparent tubular glass structure, the invention characterized in that
    the intermediate tubular structure is removed from the mandrel prior to fusion and is constrained against shrinkage in both the longitudinal and radial direction during fusing.

* * * * *